Patented Nov. 27, 1945

2,389,626

UNITED STATES PATENT OFFICE 2,389,626

PREPARATION OF VINYL HALIDES

Wilbur A. Lazier, Wilmington, Del., assignor to E. I. du Pont de Nemours & Company, Wilmington, Del., a corporation of Delaware No Drawing. Application June 30, 1942,
Serial No. 449,193

10 Claims. (Cl. 260—655)

This invention relates to the manufacture of vinyl halides and more particularly to a process for synthesizing vinyl halides by bringing a mixture comprising a hydrogen halide and a compound containing an acetylenic bond into contact with a solid hydrohalogenation catalyst. More specifically this invention relates to new catalysts for effecting the efficient synthesis of substituted and unsubstituted vinyl chlorides by addition of hydrogen chloride to acetylenic compounds.

Many catalysts are already known for bringing about the addition of hydrogen halides to unsaturated compounds. For example, it is known that aluminum chloride is active for catalyzing the synthesis of ethyl chloride from ethylene and hydrogen chloride. However, when this catalyst is employed for the addition of hydrogen chloride to acetylene, two molecules of the hydrogen chloride react with one of acetylene to form ethylidene dichloride instead of the more valuable vinyl chloride. Mercuric chloride has been suggested as a catalyst for the synthesis of vinyl chloride, but owing to its high degree of volatility, special measures have to be taken to prevent its sublimation and loss from the catalytic converter at the temperatures necessary to bring about a satisfactory rate of reaction. Activated charcoal has also been proposed as a catalyst, but in general its catalytic activity when used alone is of a low order of magnitude.

This invention has as its object an important improvement in the synthesis of vinyl chloride and like compounds. A further object is a new and improved catalyst for effecting the efficient addition of hydrogen halides to acetylenic compounds. Other objects will be apparent from the following description of the invention.

These objects are accomplished by the following invention which comprises bringing a gaseous acetylenic compound and a hydrogen halide into admixture in the presence of a gold halide, thereby synthesizing a vinyl halide.

In carrying out the improved method for the synthesis of vinyl halides, it is preferable to employ the gold halide catalyst in a dispersed form. One such method is to distribute the active catalytic component over the surface of a highly porous supporting material such as porous clay, charcoal or silica gel. This may be done by dipping the carrier material in a solution of the gold salt and carefully drying. The dry catalyst is transferred to a closed reaction tube which is provided with means for moderate heating. An approximately equimolar mixture of acetylenic compound and hydrogen halide is then passed continuously through the catalyst mass which is heated to the reaction temperature. There is a moderate rise in the temperature of the catalyst bed due to the heat of reaction and some cooling may be necessary. The effluent gases are passed to cold traps which condense the greater part of the newly-formed vinyl halide. The remaining uncondensible gases may be recycled over the catalyst in admixture with fresh make-up gas. Under properly controlled conditions the conversion per pass is better than 90% and the yield practically quantitative.

The following examples show in greater detail how the invention may be carried out in several of its modifications:

Example I

A gaseous mixture of one volume of acetylene and 1.2 volumes of dry hydrogen chloride is passed at 213° C. and a space velocity of 230 volumes of gas per unit volume of catalyst per hour over a catalyst prepared by impregnating 100 parts by weight of activated wood charcoal with a solution of 8 parts by weight of chloroauric acid trihydrate dissolved in 125 parts of water and then carefully drying. The catalyst chamber is surrounded by a boiling bath of trichlorobenzene to minimize the local temperature rise which occurs at the zone of maximum reaction. About 95% of the input acetylene is converted to vinyl chloride, which is passed through soda lime to remove excess hydrogen chloride and condensed in a trap cooled by dry ice. Emulsion polymerization of the crude condensate gives a yield of polyvinyl chloride equivalent to more than 90% of the monomeric vinyl chloride theoretically possible from the amount of acetylene passed over the catalyst.

Example II

In another experiment using under the conditions of Example I a catalyst prepared by impregnating 100 parts by weight of charcoal with a solution of 9 parts by weight of chloroauric acid trihydrate and 1.8 parts by weight of potassium chloride dissolved in 125 parts of water, an initial conversion of 95% of the acetylene to vinyl chloride was obtained, and the activity of the catalyst was undiminished after 70 hours of continuous operation.

By way of comparison, under the same conditions of operation a prior art catalyst composed of mercuric chloride-on-charcoal gave an initial conversion of only 91% which after 19 hours of operation had fallen to 80%.

Example III

A gaseous mixture of 52 parts by weight of monovinyl acetylene and 43 parts by weight of dry hydrogen chloride is passed at 200° C. and a space velocity of 300 volumes of gas per unit volume of catalyst per hour over a gold chloride catalyst prepared as described in Example I. The gases which leave the reactor are condensed in a cold trap and then fractionally distilled. The distillate consists chiefly of chloroprene (2-chlorobutadiene-1,3), identified by its reaction with maleic anhydride to give 3-chlorotetrahydrophthalic anhydride, M. P. 171° C. A small amount of dichlorobutene is also obtained as a higher-boiling fraction.

Example IV

A gaseous mixture of equal volumes of acetylene and dry hydrogen bromide is passed at 213° C. and a space velocity of 350 volumes of gas per unit volume of catalyst per hour over a potassium chloroaurate-on-charcoal catalyst prepared as described in Example II. About 90% of the input acetylene is converted to vinyl bromide which is collected in a trap cooled in dry ice and distilled, B. P. 15 to 16° C.

The above examples serve to illustrate representative embodiments of the invention. The conditions of temperature, pressure, rates of flow and form of the apparatus may be varied over a wide range. In usual practice the vinyl halide synthesis is carried out in the temperature range of 100° to 350° C. and pressures higher or lower than atmospheric pressure may be used. Higher pressures may be preferred because they increase the time of contact and hence the capacity of the unit, and aid in the condensation of the volatile products.

The catalyst may be formed by reacting metallic gold with aqua regia, or the halide salts may be procured from other sources. In any event it is preferable to improve the economy of their use by depositing them on activated charcoal or other carrier in any suitable concentration, preferably between 1% and 25%. The use of a carrier, such as activated charcoal, not only improves the conversion over that obtained by use of gold chloride alone, but also makes the catalyst physically more durable by reducing the tendency of the gold chloride to melt, sublime and dissociate at higher temperatures. The bromide or iodide of gold may be used as well as the chloride at the start of the reaction, for in the presence of the hydrogen chloride contained in the reaction mixture, the other halogens are replaced by the chlorine. In this manner the catalyst may be formed in situ at the beginning of the reaction. The catalyst may contain in addition to the gold salt, a halide salt of an alkali or alkali earth metal, such as barium chloride, potassium iodide, potassium chloride, sodium chloride, etc. By this means the life of the catalyst is increased over that given by gold chloride alone, and the formation of cuprene (a polymer of acetylene) is largely suppressed. The tendency of auric chloride to dissociate into chlorine and aurous chloride is greatly decreased by double salt formation with other metal halides.

This process is applicable to the conversion of any hydrocarbon containing acetylenic unsaturation to the corresponding substituted or unsubstituted vinyl halide. Examples of hydrocarbons containing acetylenic unsaturation falling within this class are acetylene, methyl acetylene, vinyl acetylene, divinyl acetylene, phenyl acetylene, etc. The process of this invention is applicable to the synthesis of substituted and unsubstituted vinyl halides other than substituted and unsubstituted vinyl chlorides and bromides. Thus by using hydrogen iodide in place of hydrogen chloride or bromide, as illustrated in the examples, the corresponding substituted and unsubstituted vinyl iodides are obtained.

It has been found that gold chloride is unique in being a highly active catalyst for vinyl halide synthesis. In view of the fact that it is less volatile than mercuric chloride, it would overcome some of the difficulties previously encountered with this latter type of catalyst. Comparative experiments have proved that under the same conditions of temperature and time of contact, a unit volume of gold chloride-on-charcoal catalyst will convert a larger volume of acetylene-hydrogen chloride gas mixture to vinyl chloride per unit of time than any other known catalyst. Furthermore, as is shown by the examples, especially Example II, the gold chloride catalyst has an unusually long life when compared with the usual type of catalyst, such as mercuric chloride. The discovery of this property of gold chloride marks a real advance in the art of manufacturing vinyl halide compounds.

As many apparently widely different embodiments of this invention may be made without departing from the spirit and scope thereof, it is to be understood that this invention is not to be limited to the specific embodiments shown and described.

I claim.

1. A process for synthesizing a compound from the group consisting of vinyl halide and hydrocarbon-substituted vinyl halide, which comprises bringing an acetylenic compound from the group consisting of acetylene and hydrocarbon-substituted acetylene, while in the vapor phase and admixed with a hydrogen halide, into contact with a gold halide.

2. A process for synthesizing a compound from the group consisting of vinyl chloride and hydrocarbon-substituted vinyl chloride, which comprises bringing an acetylenic compound from the group consisting of acetylene and hydrocarbon-substituted acetylene while in the vapor phase and admixed with hydrogen chloride, into contact with gold chloride.

3. The process for synthesizing chloroprene which comprises bringing monovinyl acetylene in admixture with hydrogen chloride into contact with gold chloride.

4. The process in accordance with claim 1 characterized in that the gold halide is supported on activated charcoal.

5. The process in accordance with claim 1 characterized in that the gold halide catalyst has admixed therewith a halide selected from the group consisting of alkali and alkaline earth halides.

6. The process in accordance with claim 1 characterized in that the gold halide is supported on charcoal and has admixed therewith a halide selected from the group consisting of alkali and alkaline earth halides.

7. A process for synthesizing vinyl chloride which comprises passing a mixture of acetylene and hydrogen chloride over dispersed gold halide as a catalyst.

8. A process for synthesizing vinyl bromide which comprises passing a mixture of acetylene and hydrogen bromide over dispersed gold halide as a catalyst.

9. A process for synthesizing vinyl chloride which comprises passing at temperatures ranging from about 100° C. to 350° C. a mixture of acetylene and dry hydrogen chloride over gold chloride supported on activated charcoal.

10. A process for synthesizing vinyl chloride which comprises passing at temperatures ranging from about 100° C. to 350° C. an equimolecular mixture of acetylene and dry hydrogen chloride over gold chloride as a catalyst, the latter being supported on activated charcoal and having admixed therewith a halide selected from the group consisting of alkali and alkaline earth halides.

WILBUR A. LAZIER.